(12) United States Patent
Yang et al.

(10) Patent No.: US 10,423,729 B2
(45) Date of Patent: Sep. 24, 2019

(54) METHOD FOR OPTIMAL CONTROL OF OPEN SPACE SURROUNDING BUILDING FORM BASED ON SKY VIEW EVALUATION

(71) Applicant: SOUTHEAST UNIVERSITY, Nanjing (CN)

(72) Inventors: Junyan Yang, Nanjing (CN); Jun Cao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 16/086,315

(22) PCT Filed: May 4, 2016

(86) PCT No.: PCT/CN2016/081023
§ 371 (c)(1),
(2) Date: Sep. 19, 2018

(87) PCT Pub. No.: WO2017/166371
PCT Pub. Date: Oct. 5, 2017

(65) Prior Publication Data
US 2019/0087515 A1    Mar. 21, 2019

(30) Foreign Application Priority Data
Mar. 31, 2016    (CN) .......................... 2016 1 0197548

(51) Int. Cl.
*G06F 17/50*    (2006.01)
*G06T 17/05*    (2011.01)

(52) U.S. Cl.
CPC .......... *G06F 17/5004* (2013.01); *G06F 17/50* (2013.01); *G06T 17/05* (2013.01);
(Continued)

(58) Field of Classification Search
CPC .. G06F 17/5004; G06F 17/50; G06F 2217/16; G06T 17/05; G06T 2200/04; G06T 2200/08
See application file for complete search history.

(56) References Cited

U.S. PATENT DOCUMENTS 7,305,983 B1 * 12/2007 Meder ..................... G01W 1/12
126/621
2014/0039850 A1 * 2/2014 Jee ....................... G06F 17/5009
703/2

FOREIGN PATENT DOCUMENTS

CN      101364311 A    2/2009
CN      102467591 A    5/2012
(Continued)

OTHER PUBLICATIONS

Chen et al. "Sky view factor analysis of street canyons and its implications for daytime intra-urban air temperature differentials in high-rise, high-density urban areas of Hong Kong: a GIS-based simulation approach." International Journal of Climatology 32, No. 1 (2012): 121-136 (Year: 2012).*
(Continued)

*Primary Examiner* — Jay Hann
*Assistant Examiner* — Chuen-Meei Gan
(74) *Attorney, Agent, or Firm* — Gokalp Bayramoglu

(57) ABSTRACT

The present invention is a method for optimal control of an open space surrounding building form based on sky view evaluation. The method includes the following steps: vectorizing an existing planning scheme, and establishing a 3D model; classifying open spaces in the model, 360°-scanning for mean elevations, calculating and simulating sky views of a whole region, generating a 3D contour plot, and rasterizing the 3D isogram, such that each grid has an open space classification attribute and a sky view value; performing optimal adjustment of the building form on an open space (Continued)

surrounding region having a sky view value that is inconsistent with a corresponding preset sky view index within the range of the whole region, and bringing an adjusted scheme into the model for calculation again, till the sky view value is consistent with the corresponding preset sky view index.

8 Claims, 2 Drawing Sheets

(52) U.S. Cl.
CPC ...... *G06F 2217/16* (2013.01); *G06T 2200/04* (2013.01); *G06T 2200/08* (2013.01)

(56) References Cited

FOREIGN PATENT DOCUMENTS

| CN | 103150412 A | 6/2013 |
|---|---|---|
| CN | 103186819 A | 7/2013 |
| CN | 103336894 A | 10/2013 |
| CN | 104463442 A | 3/2015 |
| CN | 105279793 A | 1/2016 |
| JP | 2014167717 A | 9/2014 |

OTHER PUBLICATIONS

Chapman, L., and J. E. Thornes. "Real-time sky-view factor calculation and approximation." Journal of Atmospheric and Oceanic Technology 21, No. 5 (2004): 730-741. (Year: 2004).*
Unger, Janos. "Connection between urban heat island and sky view factor approximated by a software tool on a 3D urban database." International Journal of Environment and Pollution36, No. 1 (2009): 59-80. (Year: 2009).*
Gal, Tamas, F. Lindberg, and Janos Unger. "Computing continuous sky view factors using 3D urban raster and vector databases: comparison and application to urban climate." Theoretical and applied climatology 95, No. 1-2 (2009): 111-123. (Year: 2009).*
Matzarakis, Andreas. "Estimation of Thermal Indices in Urban Structures-Simulations by micro scale nnodels." Proceedings of the Third International Conference on Countermeasures to Urban Heat Island, Venice, Oct. 13-15, 2014 (Year: 2014).*

* cited by examiner

METHOD FOR OPTIMAL CONTROL OF OPEN SPACE SURROUNDING BUILDING FORM BASED ON SKY VIEW EVALUATION

CROSS REFERENCE TO RELATED APPLICATIONS

This application is the national phase entry of International Application PCT/CN2016/081023, filed on May 4, 2016, which is based upon and claims priority to Chinese Patent Application No. CN 201610197548.9, filed on Mar. 31, 2016, the entire contents of which are incorporated herein by reference.

TECHNICAL FIELD

The present invention relates to the field of city planning methods, and in particular, to a method for optimal control of an open space surrounding building form based on sky view evaluation.

BACKGROUND

Sky view, also referred to as sky view range, sky visibility, sky openness, sky visible factor, firmament visibility, terrain openness, and so on, specifically refers to a percentage of a visible sky range that can be reached by people's line of sight in city open spaces enclosed by buildings. It directly depends on development layout of city construction, and are directly associated with multiple factors such as the degree of comfort and visual and psychological anticipation of public activities in a city. Therefore, the sky view is an important factor reflecting open space quality in city planning.

Existing city planning schemes generally ignore spatial feeling from human eyes. This often leads to disordered open spaces in a city space, and some open spaces are overcrowded to cause decreased open space quality;
1) there is a lack of a quantitative index to reflect the spatial feeling from human eyes, causing a gap in visual and psychological anticipation of the public, and failing to embody the human-oriented principle in city construction and development;
2) the whole technical solution lacks global simulation and evaluation. City planning and development is a long-term process, and if there is no global simulation and evaluation, different areas in city construction may interfere with each other during the development, thus affecting the degree of comfort of public activities in a city.

One of the important reasons is that there is no spatial experience, which is actually perceived from line of sight of human eyes, for simulation and analysis of the whole planning scheme. In particular, there is no evaluation factor and evaluation criterion for global simulation operation of the whole planning range.

SUMMARY

The present invention proposes a method for optimal control of an open space surrounding building form based on sky view evaluation, which aims at providing an evaluation method that can demonstrate feeling from human eyes, such that the degree of simulation of a planning scheme with actual human body perception can cover a whole planning area, thereby achieving optimal control on an open space surrounding building form.

In order to achieve the foregoing objective, the present invention may employ the following technical solution:

A method for optimal control of an open space surrounding building form based on sky view evaluation includes the following steps:

1) vectorizing an existing planning scheme, and establishing a 3D model;

2) classifying open spaces in the model, the classified open spaces being a municipal open space, a regional open space, a street open space, and an intra-neighborhood open space respectively, and setting preset sky view indexes of the municipal open space, the regional open space, the street open space, and the neighborhood open space respectively;

3) 360°-scanning for mean elevations, calculating and simulating sky views of a whole region, generating a 3D contour plot, and rasterizing the 3D contour plot, such that each grid has an open space classification attribute and a sky view value; and 4) performing optimal adjustment of the building form on an open space surrounding region having a sky view value that is inconsistent with a corresponding preset sky view index within the range of the whole region, and bringing an adjusted scheme into the model for calculation again, till the sky view value is consistent with the corresponding preset sky view index.

Compared with the prior art, the present invention, from a human-oriented point of view, achieves indexed evaluation on a sky view that can be actually felt by a human body and feedback of the evaluation to a planning scheme, and accordingly, presents a guide on optimal control of an open space surrounding building form, thereby providing a scientific basis for creating a 3D material space of a city that has comfortable dimensions for people.

DETAILED DESCRIPTION OF THE EMBODIMENTS

The technical solution of the present invention is further described below with reference to the drawings.

Figure 1:
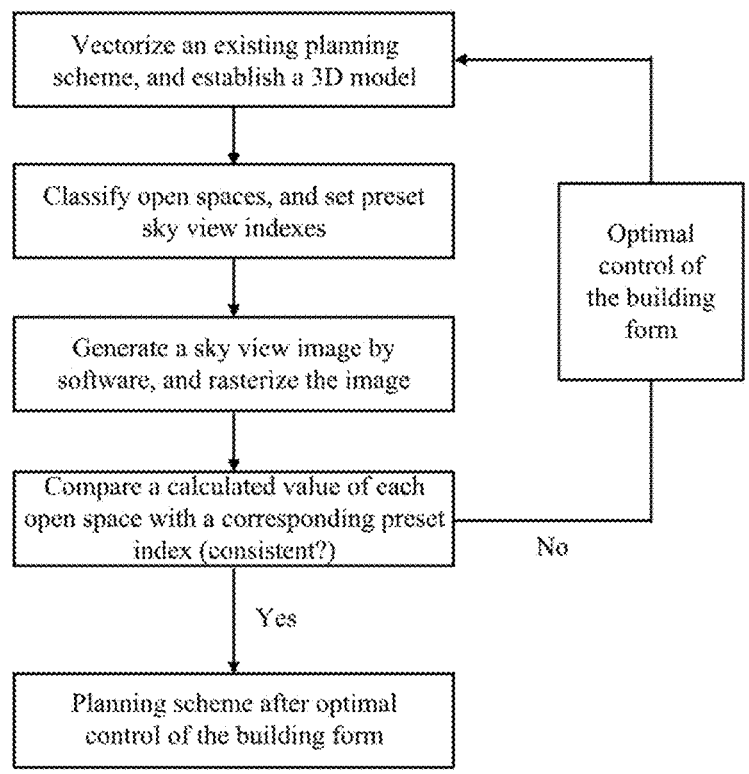
FIG. 1 is a flowchart of the present invention.
Figure 2:
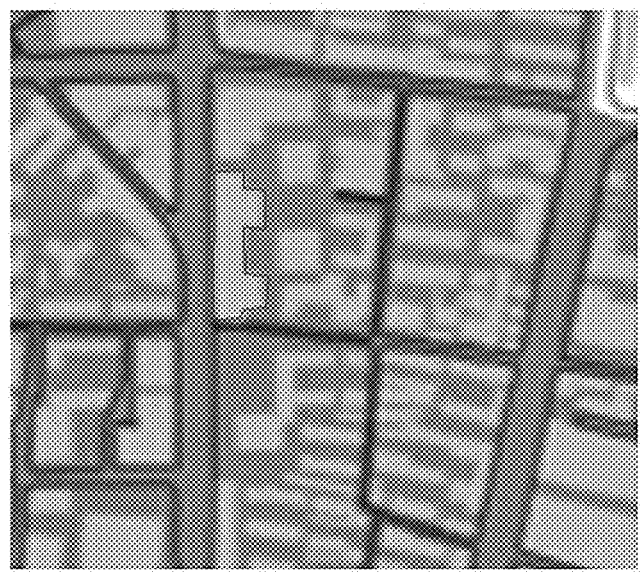
FIG. 2 is a schematic view of outlining outer contours of blocks and buildings according to the present invention.

FIG. 1 is a flowchart of the whole embodiment of the present application.

Figure 3:
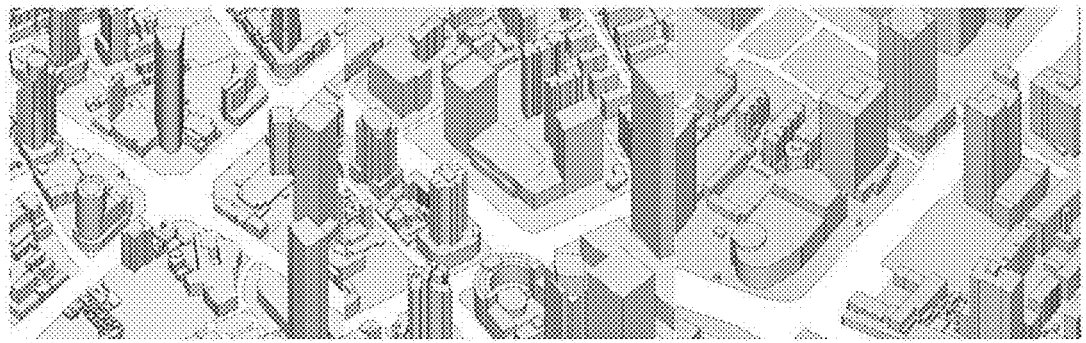
FIG. 3 is a schematic view of generating a 3D model of an existing scheme according to the present invention.
Figure 4:
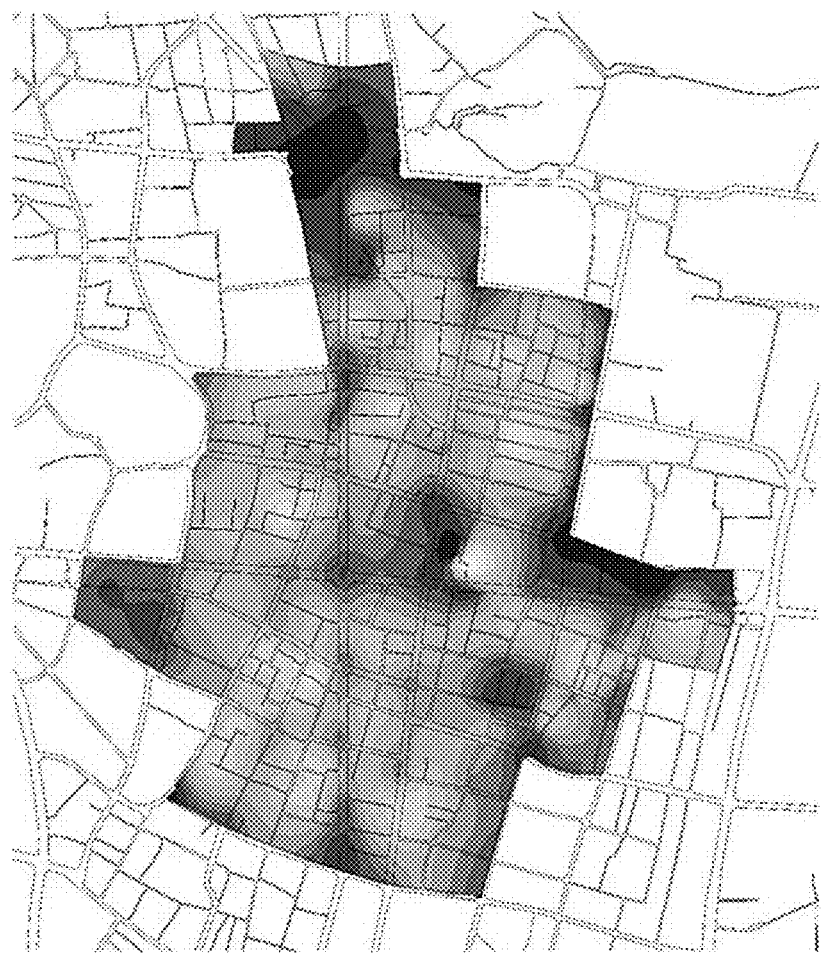
FIG. 4 is a 3D contour map of a global sky view simulated by software according to the present invention.

A method for optimal control of an open space surrounding building form based on sky view evaluation includes the following steps:

1) Vectorize an existing planning scheme, and establish a 3D model. Step 1) specifically includes:

1.1) inserting a raster image of an existing general layout plan (for example, inserting in AutoCAD software), and scaling the image (by a "Scale" command) to adjust the size of the image to an actual size;

1.2) outlining contour lines of all blocks and contour lines of all buildings in each block (for example, by a "Polyline" command), and marking a number indicating the number of floors of each building within the contour line of the corresponding building (referring to FIG. 3); and 1.3) extruding a building with a number-of-floor attribute into a 3D model (for example, modeling in software ArcGIS, referring to FIG. 4).

2) Classify open spaces in the model, the classified open spaces being a municipal open space, a regional open space, a street open space, and an intra-neighborhood open space respectively, and set preset sky view indexes of the municipal open space, the regional open space, the street open space, and the intra-neighborhood open space respectively. The municipal open space refers to a crossroad and square at a primary center of a city, the regional open space refers to a crossroad and square at a secondary center of the city, the street open space refers to a street space excluding the municipal open space and the regional open space, and the intra-neighborhood open space refers to an intra-block open space excluding the municipal open space, the regional open space, and the street open space. The preset sky view indexes set for various types of open spaces are as follows: an index value of the municipal open space is 0.8, an index value of the regional open space is 0.7, an index value of the street open space is 0.65, and an index value of the intra-neighborhood open space is 0.6. Open spaces of different cities and regions have different preset sky view indexes, and the preset sky view indexes are adjustable within ±5% according to different cities and regions. Using the Xinjiekou region as an example, considering that the Xinjiekou region is the primary center of Nanjing, the preset index value of the municipal open space is increased by 2.5%.

3) 360°-scan for mean elevations, calculate and simulate sky views of a whole region, generate a 3D contour plot, and rasterize the 3D contour plot (in conjunction with FIG. 5), such that each grid has an open space classification attribute and a sky view value. Step 3) specifically includes:

3.1) performing global simulation on the 3D model by using sky view simulation software, selecting, in a whole research area, multiple observation points covering the whole area, 360°-scanning all buildings in the research area from the multiple observation points, calculating a maximum elevation, and statistically calculating a mean elevation, and then calculating average sky occlusions of all observation points in the whole research area according to the following formula:

$$\bigcup = \sum_{i=0}^{n} \beta\max[i]/_{n*\pi*0.5},$$

wherein scanning needs to be performed $n=2\pi/\partial_0$ times, $\bigcup$ denotes a sky occlusion of a corresponding observation point, radian $\partial_0$ denotes a scan angular interval, n denotes the number of scans, each observation point being subjected to multiple scans, and $\beta_{max}$ denotes a maximum elevation rotated into during each scan; all maximum elevations of n scans are subjected to statistical averaging of elevations, to obtain a sky occlusion of a corresponding observation point, and i denotes an observation point; and calculating, according to the following formula, a difference with an unoccluded sky visibility 1, to obtain an average sky visibility $\cap$ of a corresponding observation point:

$$\cap = 1 - \bigcup = 1 - \Sigma_{i=0}^{n}\beta\max[i]/_{n*\pi*0.5},$$

wherein $\cap$ denotes an average sky visibility;

3.2) importing an image, and performing interpolation operation on the average sky visibilities of all the observation points, to obtain a simulated 3D contour map of the sky view; and 3.3) rasterizing the image, and superimposing the image with the previous preset sky view indexes of open spaces, such that each grid has an open space classification attribute and a sky view value;

pixel precision of the generated grids is at least 20 m*20 m;

3.2) importing an image, and performing interpolation operation on the average sky visibilities of all the observation points, to obtain a simulated 3D contour map of the sky view; and 3.3) rasterizing the image, and superimposing the image with the previous preset sky view indexes of open spaces, such that each grid has an open space classification attribute and a sky view value.

4) perform optimal adjustment of the building form on an open space surrounding region having a sky view value that is inconsistent with a corresponding preset sky view index within the range of the whole region, and bring an adjusted scheme into the model for calculation again, till the sky view value is consistent with the corresponding preset sky view index. Step 4) includes:

4.1) designating the preset sky view index of each grid point as S, comparing a value of the average sky view $\cap$ with a value of S, and marking all grids in which $\cap > S$;

4.2) if there exists a marked point having a sky view value that is inconsistent with the corresponding preset index, performing optimal adjustment of the building form on an open space surrounding region where the marked grid point exists, then returning to Step 1), and performing calculation using the model according to the steps; and 4.3) if there exists no marked point having a sky view value that is inconsistent with the corresponding preset index, indicating that an optimized building form design scheme is obtained.

In addition, the present invention has numerous implementation methods and approaches, and the above description is merely the preferred embodiment of the present invention. It should be noted that, several improvements and modifications may be made by those of ordinary skill in the art without departing from the principle of the present invention, and these improvements and modifications should also be considered within the protection scope of the present invention. Various components not explicitly described in the present embodiment can all be achieved using the prior art.

What is claimed is:

1. A method for an optimal control of surrounding building forms of open spaces based on a sky view evaluation, comprising step 1: vectorizing an existing planning scheme, and establishing a 3D model;

step 2: classifying the open spaces in the 3D model, wherein the open spaces are classified as a municipal open space, a regional open space, a street open space, and an intra-neighborhood open space respectively, and a preset sky view indexes of each of the municipal open space, the regional open space, the street open space, and the intra-neighborhood open space is set respectively;

step 3: 360°-scanning for a mean elevation angle, calculating and simulating sky views of a whole region, generating a 3D contour plot, and rasterizing the 3D contour plot, such that each grid has an open space classification attribute and a sky view value; and step 4: performing an optimal adjustment of the building forms on an open space surrounding region having the sky view value that is inconsistent with a corresponding preset sky view index within a range of the whole region, and bringing an adjusted scheme into the model for calculation again, till the sky view value is consistent with the corresponding preset sky view index.

2. The method for an optimal control of surrounding building forms of open spaces based on a sky view evaluation according to claim 1, wherein the step 14 comprises:
inserting a raster image of an existing general layout plan, and scaling the raster image to adjust a size of the raster image to an actual size;
outlining contour lines of all blocks and contour lines of all buildings in each block, and marking a number indicating the number of floors of each building within the contour lines of a corresponding building; and
extruding a building with a number-of-floor attribute into the 3D model.

3. The method for an optimal control of surrounding building forms of open spaces based on a sky view evaluation according to claim 1, wherein in the step 2, the municipal open space refers to a crossroad and square at a primary center of a city, the regional open space refers to a crossroad and square at a secondary center of the city, the street open space refers to a street space excluding the municipal open space and the regional open space, and the intra-neighborhood open space refers to an intra-block open space excluding the municipal open space, the regional open space, and the street open space.

4. The method for an optimal control of surrounding building forms of open spaces based on a sky view evaluation according to claim 3, wherein in the step 2, the preset sky view index of each open space is set as follows: an index value of the municipal open space is 0.8, an index value of the regional open space is 0.7, an index value of the street open space is 0.65, and an index value of the intra-neighborhood open space is 0.6.

5. The method for an optimal control of surrounding building forms of open spaces based on a sky view evaluation according to claim 4, wherein the open spaces of different cities and regions have different preset sky view indexes, and the preset sky view indexes are adjustable within ±5% according to different cities and regions.

6. The method for an optimal control of surrounding building forms of open spaces based on a sky view evaluation according to claim 1, wherein the step 3 comprises:
performing a global simulation on the 3D model by using a sky view simulation software, selecting, in a whole research area, multiple observation points covering the whole research area, 3600 scanning all buildings in the research area from the multiple observation points, calculating a maximum elevation, in each scanning, statistically calculating the mean elevation angle and then calculating an average sky occlusion of each observation point in the whole research area according to the following formula: wherein the scanning needs to be performed $$n = \frac{2\pi}{\partial_0}$$

times, U denotes a sky occlusion of a corresponding observation point, radian $\partial_0$, denotes a scanning angular interval, n denotes the number of the scanning, each observation point is subjected to multiple scannings, and denotes a maximum elevation rotated into during each scanning; all maximum elevation angles of n scannings are statistically calculated to obtain an average elevation angle, so as to obtain a sky occlusion of a corresponding observation point, and i denotes an observation point;

calculating, according to the following formula, a difference with an unoccluded sky visibility to obtain an average sky visibility ∩of a corresponding observation point:

∩=1-U=1- wherein ∩ denotes an average sky visibility, and the unoccluded sky visibility equals to 1;

importing an image, and performing an interpolation operation on an average sky visibility of each observation point, to obtain a simulated 3D contour map of the sky view; and rasterizing the image, and superimposing the image with the sky view index of each open space, such that each grid has the open space classification attribute and the sky view value.

7. The method for an optimal control of surrounding building forms of open spaces based on a sky view evaluation according to claim 6, wherein the step 4 comprises:
designating the sky view index of each grid point as S, comparing a value of the average sky visibility ∩ with a value of S, and marking all grid points-satisfying a condition of ∩>S;

if there is a marked grid point having a sky view value that is inconsistent with a corresponding preset index, performing the optimal adjustment of the building form on an open space surrounding region where the marked grid point exists, then returning to the step 1, and performing calculation using the 3D model according to the steps 1-4; and if there is no marked grid point having a sky view value that is inconsistent with a corresponding preset index, indicating that an optimized building form design scheme is obtained.

8. The method for an optimal control of surrounding building forms of open spaces based on a sky view evaluation according to claim 6, wherein a pixel precision of the grids generated in the step 3 is minimum of at least 20 m*20 m.

* * * * *